Sept. 21, 1948.                    J. R. HEFELE                    2,449,848
                              PULSE-ACTUATED CIRCUIT
Filed Aug. 12, 1943                                        3 Sheets-Sheet 1
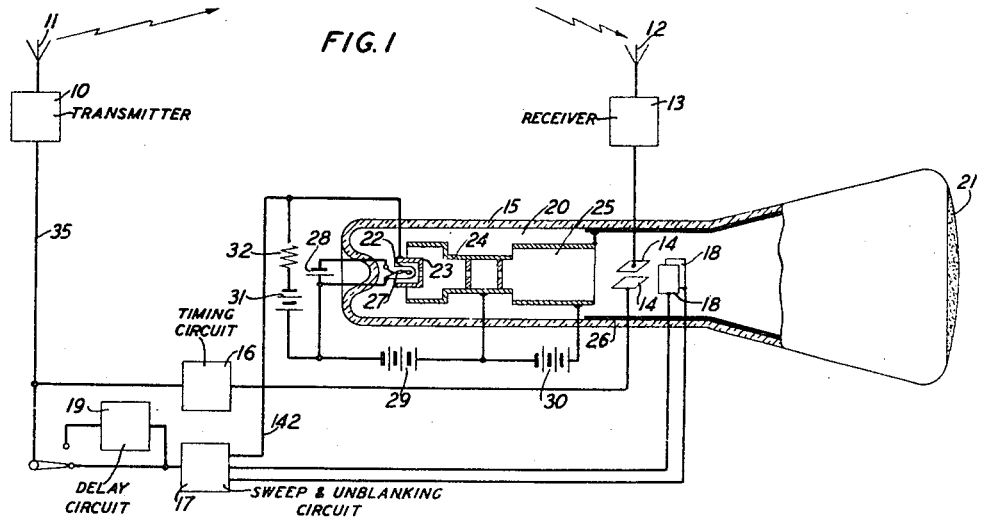
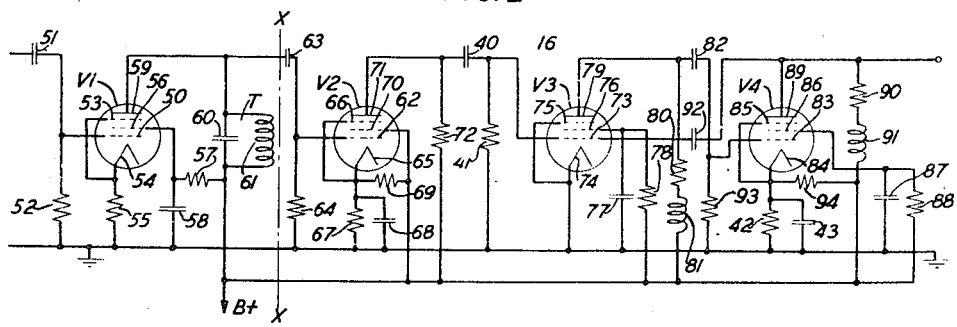
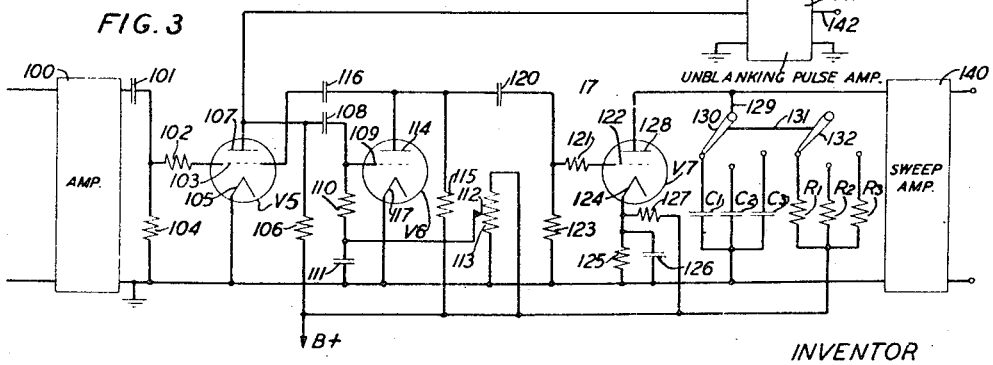
INVENTOR
J.R. HEFELE
BY Hugh S. Wertz
ATTORNEY

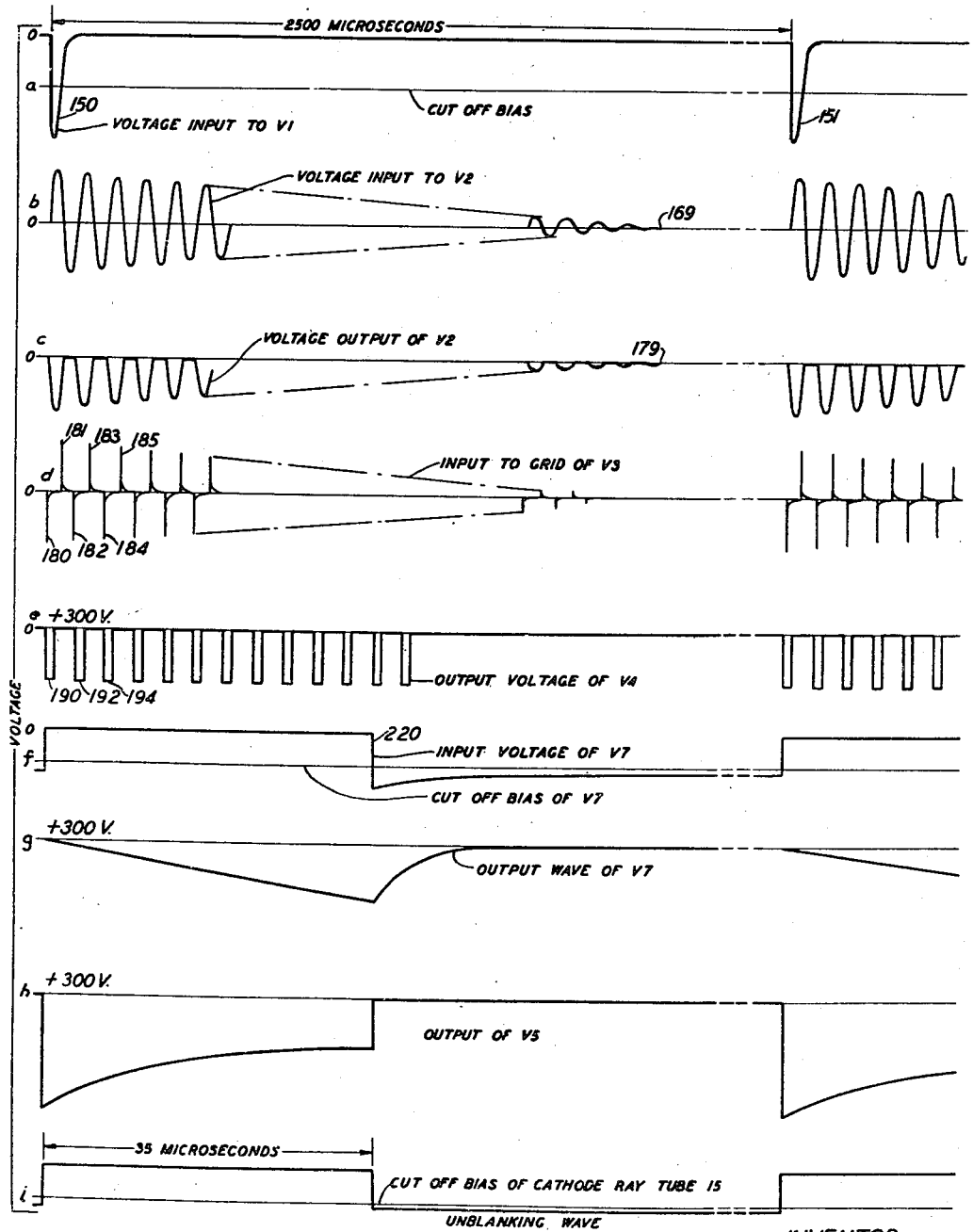

Sept. 21, 1948.   J. R. HEFELE   2,449,848
PULSE-ACTUATED CIRCUIT
Filed Aug. 12, 1943   3 Sheets-Sheet 3

INVENTOR
J.R. HEFELE
BY Hugh S. Wertz
ATTORNEY

Patented Sept. 21, 1948

2,449,848

UNITED STATES PATENT OFFICE 2,449,848

PULSE-ACTUATED CIRCUIT

John R. Hefele, Yonkers, N. Y., assignor to Bell Telephone Laboratories, Incorporated, New York, N. Y., a corporation of New York Application August 12, 1943, Serial No. 498,322

15 Claims. (Cl. 315—22)

This invention relates to pulse-actuated electric circuits and more specifically to circuits for generating series of pulses.

It is an object of this invention to provide novel pulse-actuated electric circuits.

It is another object of the present invention to provide a novel circuit for generating series of pulses. This circuit may be utilized, by way of example, in an arrangement for indicating elapsed time.

In pulse reflection type image locating and distance measuring systems (radar systems), ultrahigh frequency carrier waves modulated with pulses of very short time duration are emitted, reflections thereof are received from objects upon which the emitted pulses impinge, and the reflection times for particular objects are determined to provide an indication of the distances to the objects from which the respective reflected signals are received. Electrical variations received at the receiving point constitute a plurality of series or trains of impulses each series comprising, for example, a transmitted pulse (i. e., a portion of the carrier modulated with a pulse) and one or more reflections or echo pulses interspersed with and supplemented by variations due to "noise," etc. After detection and amplification, the series of impulses (frequently called the video signal or signals) are applied to one set of deflecting plates in a cathode ray oscilloscope and to the other set of plates of the oscilloscope is applied a sweep or deflecting wave. In a certain form of radar arrangement heretofore used, there is also applied to the set of deflecting plates to which the series of impulses are applied a timing wave for producing "pips" on the oscilloscope screen at spaced intervals in order that the distance between the transmitted pulse and a selected echo pulse can be more readily determined. In this arrangement, the marking pulses producing the "pips" are set up under control of oscillations which are generated as harmonics of the frequency of repetition of the transmitted pulses. If the pulse repetition frequency varies (and it frequently does), the period between marking pulses varies and no longer represents the same distance along the line to the reflecting object.

It is still another object of the present invention to provide means for generating marking pulses for radar systems the frequency of repetition of which is independent of the pulse repetition frequency so that there is no need for maintaining the latter constant.

In accordance with a specific embodiment of the invention, chosen by way of example for illustrative purposes, a part of each pulse generated for transmission is used to shock-excite a tuned circuit to give a series of oscillations of constant periodicity but of gradually diminishing intensity. These oscillations are rectified and then differentiated to produce a sharp pulse each time the oscillatory wave passes through zero. This pulse wave is also of gradually diminishing intensity. The negative ones of these pulses are utilized to actuate a two-tube circuit called a "monovibrator" to produce square-topped pulses of constant intensity until a point is reached (for example, at about 40 microseconds after the start of each of the transmitted pulses which are substantially 2500 microseconds apart and have a duration of less than a microsecond) at which the differentiated pulse no longer has a sufficient intensity to operate the "monovibrator." Square-topped pulses from the monovibrator are applied to the vertical deflecting plates of the oscilloscope tube along with the video signal (trains of impulses) from the radar receiver, while a sweep wave is applied to the horizontal deflecting plates. The square-topped pulses produce "pips" which are seperated by a fixed distance representative of, for example, one microsecond time interval. This interval is fixed by the constants of the tuned circuit rather than by the time between transmitted pulses which may (and frequently does) vary as much as 5 to 10 per cent or more from its assigned or average value. Because of the fact that each "pip" bears a fixed time relation to the point in each cycle of the wave where it passes through zero, the pulses producing the "pips" are evenly spaced even though the amplitude of the oscillations is constantly diminishing. The sweep wave is adapted to be initiated simultaneously with the transmitted pulse or at some fixed time thereafter or therebefore. The sweep wave is of the type called "precision sweep" or "expanded sweep," because of the fact that the duty cycle of the sweep wave, that is, the time period when it is functioning to sweep the beam, is only a small portion of the time between transmitted pulses. By way of example, if the time between pulses is of the order of 2500 microseconds, the sweep wave may be of the order of 35 microseconds duration.

In another embodiment of the invention, a tuned circuit is shock-excited to give a series of oscillations of constant periodicity but of gradually diminishing intensity as in the embodiment described above. These oscillations are applied to a tube which is biased negatively so that only during the positive lobes of the voltage wave applied to the control grid of this tube does current flow therethrough. Thus, in the plate circuit of this tube are found negative pulses, each of which, for a one-megacycle oscillatory wave, is one-half a microsecond in duration and is separated from its predecessor and successor by one-half microsecond "off" periods. These negative pulses are used to shock-excite a second tuned circuit which, for example, is tuned to a frequency of five megacycles. A second series of oscillations is thus set up in the second tuned circuit, these oscillations being of the frequency of five megacycles and of constantly diminishing intensity. Only the first pulse (negative) of each oscillation, however, causes a response in an unbiased tube to the input circuit of which the second tuned circuit is connected inasmuch as the first time the wave goes positive the oscillations are damped out because of the flow of grid current in this tube. Thus, positive pulses are produced in the plate circuit of this tube every microsecond which are one-tenth of a microsecond wide.

While the invention in certain of its aspects relates to improvements in radar systems or in other systems where it is desired to obtain an indication of elapsed time, it will be apparent that other aspects of the invention are not so limited as it is useful in any place where it is desired to have means for producing a train or trains of accurately spaced pulses. The invention is applicable, for example, in television to produce a series of line-scanning-frequency synchronizing pulses from each pulse of frame-scanning-frequency, thus making it necessary to transmit from the sending station to the receiving station only the latter.

The invention will be more readily understood by referring to the following description taken in connection with the accompanying drawings forming a part thereof in which:

Fig. 1 is a schematic diagram of a simple radar system;

Fig. 2 is a diagram of a circuit for producing timing or marking pulses which may be used in the system of Fig. 1;

Fig. 3 is a diagram of a sweep and unblanking circuit for use in the system of Fig. 1;

Fig. 4 shows the approximate wave forms at various parts of the circuits of Figs. 2 and 3;

Figure 5:
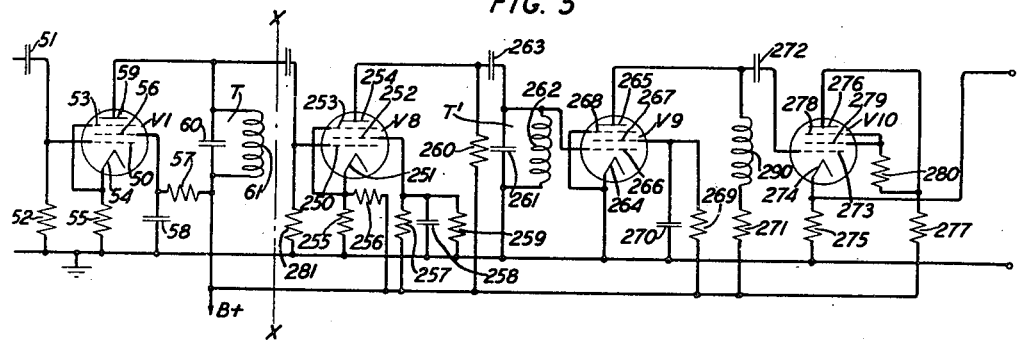
Fig. 5 is a diagram of a modification of the circuit of Fig. 2.

Referring more specifically to the drawings, Fig. 1 shows, by way of example to illustrate the principles of this invention, a simplified circuit diagram of a radio object-locator system (radar system). Any suitable transmitter 10 for the system may be utilized. For example, the transmitter 10 can comprise an oscillator for providing a sine wave having a suitable periodicity which can conveniently be 400 cycles per second. This oscillator energizes a pulse generator of any one of several suitable types well-known in the art. For example, see United States Patent 2,117,752, issued May 17, 1938, to L. R. Wrathall, which provides an energy pulse at a particular point of each cycle of the input wave provided to it. The pulses from the pulse generator are then applied to a carrier generator and modulator of any suitable type which may, for example, generate a carrier wave of approximately 3300 megacycles per second and this carrier wave is modulated by the pulses from the pulse generator. The modulated wave is applied to the transmitting antenna 11.

Waves reflected from one or more objects within the range of the transmitting antenna 11 are received by a receiving antenna 12. The antennas 11 and 12 can be of any suitable type; for example, they can be of the polystyrene "polyrod" type disclosed in an application of G. E. Mueller, Serial No. 469,284, filed December 17, 1942, and which issued as Patent 2,425,336 on August 12, 1947. Connections to the transmitting antenna 11 and from the receiving antenna 12 are made by coaxial cable. The reflected waves (and also the transmitted waves) picked up by the receiving antenna 12 are applied to a receiver 13 of any suitable form wherein they are detected and amplified and applied to one of the vertical deflecting plates 14 of a cathode ray oscilloscope 15. Pulses from the pulse generator in the transmitter 10 are applied to a timing circuit 16, which will be described more fully below in connection with Fig. 2, wherein a multiplicity of pulses of fixed spacing are generated and applied to the other of the vertical deflecting plates 14. Pulses from the pulse generator in the transmitter 10 are also applied to a sweep and unblanking circuit 17, to be described more fully below in connection with Fig. 3, to cause the initiation of a sweep wave which is applied to the horizontal deflecting plates 18, 18 in the oscilloscope 15. If desired, a delay circuit 19 can be connected in the circuit leading to the sweep circuit 17 in order to delay the pulses from the transmitter. This makes it possible to start the sweep wave at any time after the transmitted pulse from the transmitter 10. The video signal can be delayed, if desired, so that effectively the cathode ray tube sweep circuit is started before the transmitted pulse is displayed on the oscilloscope screen. This last-mentioned effect can, of course, be produced by inserting a delay circuit or delay device between the pulse generator in the transmitter and the modulator therein.

The oscilloscope 15 includes an envelope enclosing an electron gun 20, the two sets of deflecting plates 14, 14 and 18, 18, and a fluorescent screen 21. The electron gun 20 comprises a cathode 22, a control element 23, a first anode 24, and a second anode, including cylindrical member 25 and a conducting coating 26, for forming and accelerating a beam of electrons and for focussing it into a fine spot upon the fluorescent screen 21. The cathode 22 is heated by a filament 27 which is supplied with current from a source of potential 28. The anode 24 is positively biased with respect to the cathode 22 by means of a source of direct potential 29 while the anode 25, 26 is positively biased with respect to the anode 24 by means of the source of direct potential 30. Signals are applied from the circuit 17 to the control element 23 in order to unblank the beam during the time the sweep wave is applied to the deflecting plates 18, 18. At other times the beam is blanked out because of the negative bias applied to the control element 23 by means of the source of direct potential 31 connected between the cathode 22 and the control element 23. A leak resistor 32 is also connected in this circuit.

Reference will now be made to Fig. 2 which shows a timing circuit 16 for producing marking pulses or "pips" on the screen 21 of the oscilloscope 15. Briefly stated, the circuit 16 comprises an amplifier tube VI in the output circuit of which is a tuned circuit T which is shock-excited (when the tube VI is cut off by the pulse applied to its input circuit) to give a series of oscillations of constant periodicity but of gradually diminishing intensity, and circuit means to be now briefly described for utilizing these oscillations to produce marking pulses. The oscillations are applied to the tube V2 wherein they are rectified and the rectified waves are differentiated by the circuit comprising the condenser 40 and the resistance 41 to produce a sharp pulse each time the oscillatory wave passes through zero. This series of pulses is then applied to a "monovibrator" circuit (a species of a multivibrator, as will be pointed out below) comprising the tubes V3 and V4 to produce square-topped pulses of constant intensity until the point is reached at which the differentiated pulse no longer has a sufficient intensity to operate the "monovibrator," this last-mentioned point being determined by the bias for the tube V4 produced by the resistance 42 and the condenser 43. As pointed out above, the square-topped pulses in the output of the "monovibrator" are applied to one of the deflecting plates 14 in the oscilloscope 15.

Proceeding now to a more detailed description of the marking or timing circuit 16, the pulses from the pulse generator in the transmitter 10 are applied to the control grid 50 of the tube VI through a coupling condenser 51. A leak resistor 52 is also connected between the control grid 50 and ground. The suppressor grid 53 is connected to the cathode 54 which is connected to ground through the resistor 55. The screen grid 56 is connected to the positive pole of a source of direct potential (represented in the drawing by the symbol B+) through the resistor 57. A by-pass condenser 58 is connected between the screen grid 56 and ground while the anode 59 of the tube VI is connected through the tuned circuit T comprising the parallel-connected capacity member 60 and inductance member 61 to B+.

The anode 59 of the tube VI is also connected to the control grid 62 of the tube V2 through a coupling condenser 63, a leak resistor 64 being connected between the grid 62 and ground. The cathode 65 and the suppressor grid 66 are connected together and their common terminal is connected to ground through a parallel-connected resistance member 67 and capacity member 68 which, together with the resistor 69, provide bias for the control grid 62. The cathode is connected to B+ through the resistor 69 so that the cathode is at a positive potential with respect to the control element 62 at all times. The screen grid 70 is connected to B+ while the anode 71 is connected through the anode resistor 72 to B+. The anode 71 is also connected through the condenser 40 of the R-C differentiating circuit 40—41 to the control grid 73 of the tube V3. The cathode 74 and the suppressor grid 75 of the tube V3 are connected together and their common terminal connected to ground. The screen grid 76 is connected through the by-pass condenser 77 to ground and through the resistance 78 to B+, while the anode 79 is connected through the resistance member 80 and the high frequency compensating inductance member 81 to B+.

The anode 79 is also connected through the coupling condenser 82 to the control grid 83 of the tube V4. This tube has its cathode 84 and its suppressor grid 85 connected together and through the parallel-connected members 42 and 43 to ground. Its screen grid 86 is connected through the by-pass condenser 87 to ground and through the resistance 88 to B+. A resistor 94 is connected between the cathode 84 and B+ and cooperates with the members 42 and 43 to bias the cathode positively with respect to the control grid 83. The anode 89 is connected through the resistance 90 and the high frequency compensating inductance 91 to B+ and is also connected through the coupling condenser 92 to the control grid 73 of the tube V3 so that tubes V3 and V4 resemble a multivibrator although they operate in a somewhat different manner, as will be pointed out below. Because of the fact that the tubes V3 and V4 together constitute a circuit which is not self-oscillating but must be actuated by an incoming pulse, they have been given the term "monovibrator."

Before explaining in detail the operation of the circuit of Fig. 2 in the system of Fig. 1, a suitable sweep and unblanking circuit 17 will be described. This circuit is shown in Fig. 3. The sweep circuit comprises a pulse amplifier 100, a "precision" multivibrator (V5 and V6), three sweep condensers ($C_1$, $C_2$ and $C_3$) each having a resistor in series therewith, and a discharge tube V7. The voltage variations across the selected sweep condenser constitute the sweep wave. A pulse is also taken from the multivibrator and after amplification is applied as a positive pulse to the beam control means 23 in the oscilloscope to unblank the beam during each sweep period.

Pulses from the transmitter 10 are applied either directly or through a delay circuit 19, which may be of any suitable form, such as the circuit shown in the application of B. M. Oliver, Serial No. 486,780, filed May 13, 1943, and which issued as Patent 2,433,863 on January 6, 1948, to the input of the circuit 17 which may, if desired, include an amplifier 100 for increasing the magnitude of the pulses. The output of the amplifier 100 is connected through a coupling condenser 101 and "anti-sing" resistance 102 to the control grid 103 of tube V5. A leak resistor 104 is connected in the circuit between the grid 103 and the cathode 105, while an anode resistor 106 is connected between the anode 107 and B+. The anode 107 is connected through a coupling condenser 108 to the grid 109 of the tube V6. A leak resistor 110 is connected between the grid 109 and one terminal of a condenser 111, the other terminal of which is connected to ground and to the cathode 117. The common terminal of the resistance 110 and condenser 111 is connected to a variable tap 112 of a resistor 113 connected between ground and B+ in order to positively bias the control grid 109 with respect to the cathode 117. The anode 114 is connected through the anode resistor 115 to B+ and back through the coupling condenser 116 to the control grid 103 of the tube V5 to complete the multivibrator connection. The multivibrator V5, V6 and its method of operation are standard except for the provision of the positive bias on the grid of the tube V6. The bias causes a steeper portion of the discharge curve of the coupling condenser 108 to cross a reference potential (the cut-off grid voltage of tube V6) than in an arrangement where the positive bias is not used. This makes more precise the length of time tube V6 is cut off and thus improves the stability of the multivibrator. For a description of the advantages resulting from the use of positive grid bias in multivibrators and of their operation, reference is made to Patent 2,159,792, Geiger, May 23, 1939, and to Patent 2,266,526, White, December 16 1941.

The anode 114 of the tube V6 is also connected through a coupling condenser 120 and "anti-sing" resistor 121 to the control grid 122 of the tube V7. This causes a positive pulse to be applied to the grid 122 once for each transmitted pulse. A leak resistor 123 is connected between the common terminal of the condenser 120 and the resistor 121 and ground. Bias for the control grid 122, with respect to the cathode 124, is provided by means of the parallel-connected resistance member 125 and capacity member 126 and a bleeder resistor 127. By this means the cathode 124 is placed at a positive potential at all times with respect to the control element 122.

The anode 128 is connected through a connection 129 and switch 130 to any desired one of three sweep condensers C1, C2, and C3, the other terminal of each of which is connected to ground and through a connection 131 and switch 132 to any one of sweep resistors R1, R2 and R3, the other terminal of each of which is connected to B+. The switches 130 and 132 are adapted to be moved together so that when C1 is being used, R1 will also be used. The constants for the circuit elements C1, C2, C3, R1, R2 and R3 are chosen to produce three sweep times, that is, for example, 3 microseconds, 15 microseconds and 35 microseconds. The 35-microsecond timing wave, for example, permits the whole range (of a certain form of radar equipment) to be visible on the oscilloscope screen; the 15-microsecond timing wave makes possible the presentation of the signal for a range up to about 2,500 yards (1 microsecond corresponding to a range of 163.8 yards), and a 3-microsecond timing wave permits the shape of the transmitted pulse to be shown in detail. The selected condenser, for example, C1, is charged up through its corresponding resistor R1 from B+. Periodically this condenser is discharged by means of the pulse from the transmitter which energizes the "precision" multivibrator comprising the tubes V5 and V6 to produce sharp positive pulses (one for each transmitted pulse) which cause the tube V7, which has previously been non-conducting because of the bias applied to its control grid, to be conducting for a period of time corresponding to the duration of the pulse 220 shown in Fig. 4f (this period being determined by the circuit constants of the multivibrator) and discharge the condenser C1. The voltage variations across the condenser (shown in Fig. 4g) are applied to a conventional sweep circuit amplifier 140, the output terminals of which are connected to the deflecting plates 18.

The cathode ray oscilloscope 15 has its beam biased to cut-off during all of the time between successive ones of the transmitted pulses except for the period required for the sweep wave. The bias is provided to the control element 29 by means of the source 31 and the resistor 32. Upon the occurrence of a synchronizing pulse from the transmitter in the lead 35, a negative pulse (see Fig. 4h) is produced in the plate 107 of the tube V5 and this is applied through an unblanking pulse amplifier 141, wherein it has its phase shifted 180 degrees, to the connection 142 which is connected to the control element 29. The positive output pulse from the amplifier 141 (see Fig. 4i) is of sufficient duration so that the tube is unblanked during the portion of the time consumed by the sweep. Thus the trace on the screen 21 will be visible during this time.

The detailed operation of the system shown in Fig. 1 embodying the timing circuit 16 of Fig. 2 and the sweep and unblanking circuit 17 of Fig. 3 will now be described, reference being also made to Fig. 4 which comprises various plots of voltage versus time at different parts of the circuits of Figs. 1, 2 and 3.

A series of pulses 150, 151, etc., produced in the transmitter 10, modulates an ultra-high frequency carrier and the modulated carrier is sent out from the transmitting antenna 11. The pulses 150 and 151 may be, for example, approximately 2,500 microseconds apart and are of a duration, for example, of the order of a microsecond or less. Between transmitted pulses, echo signals, produced by reflections of the transmitted pulses from one or more targets, are received by the receiving antenna 12 and these, with the transmitted pulse and the accompanying noise, produce a series of trains of signals or electrical variations. These trains, after having been removed from the carrier and amplified in the receiver 13, are applied as the video signal to the upper one of the vertical deflecting plates 14, 14 in the cathode ray oscilloscope 15. At the same time, the pulses 150, 151, etc., or synchronizing pulses corresponding thereto and either substantially simultaneously therewith or at some fixed time relationship to the transmitted pulses, are applied by means of the connection 35 to the timing circuit 16 and also to the sweep and unblanking circuit 17, either directly or through the delay circuit 19. These pulses cause the actuation of the circuits 16 and 17. Preferably, the operation of the timing circuit is initiated substantially simultaneously with each transmitted pulse and the production of the sweep wave is also initiated substantially simultaneously with the transmitted pulse when it is desired to view the entire range on the oscilloscope screen. When it is desired to view only a portion of the range, that is, when either the 15-microsecond sweep wave or the 3-microsecond sweep wave is used, it may be desirable to utilize the delay circuit 19 in order to start the sweep wave a predetermined time after each transmitted pulse or to delay the video signal with respect to the pulse in the line 35, as pointed out above. This is done, of course, so that the desired portion of the train of signals appears as a trace on the oscilloscope screen. While the sweep circuit shown in Fig. 3 has provisions for varying the sweep time so that three different sweeping periods can be obtained, in the absence of any statement to the contrary, it will be assumed in the following description that the sweep wave which is utilized is that which has a period corresponding to the maximum range of the equipment, that is, in the example given, a sweep period of 35 microseconds which corresponds to a range of more than 5,000 yards. Obviously this range is given merely by way of example as radar equipments are known which have maximum ranges greater or less than this depending upon the specific use desired.

The synchronizing pulse applied to the circuit 16 by means of the connection 35 is applied to the tube V1 which has previously been conducting. A negative pulse causes this tube to be cut off sharply, thus causing the potential of the plate 59 to rise abruptly and charge the condenser 60 which, together with the inductance 61, comprises the tuned circuit T. Oscillations are then set up in the tuned circuit T, these oscillations being shown in Fig. 4b. Due to the resistance of the tuned circuit T, the oscillations in this series have gradually diminishing amplitudes and are gradually reduced to zero at a point 169 (after about 40 or 50 oscillations or so). Obviously the oscillations shown in Fig. 4b are not drawn to scale. As these oscillations terminate after about 40 or 50 microseconds, the tuned circuit is at rest long before the next transmitted pulse is applied to the input circuit of the circuit 16.

The waves shown in Fig. 4b are applied to the input circuit of the tube V2 which is negatively biased to cut-off so that the tube acts as a rectifier and produces in the output circuit thereof pulses in the negative direction (see Fig. 4c). These pulses, which terminate at the point 179, are applied to the differentiating circuit comprising the condenser 40 and the resistance 41 to produce pulses, such as those shown in Fig. 4d, which are applied to the control grid of the tube V3. The tubes V3 and V4 together constitute a multivibrator of the unbalanced type inasmuch as the control grid 83 of the tube V4 is negatively biased with respect to its cathode 84 by means of the parallel-connected resistance member 82 and condenser 43.

Figure 7:
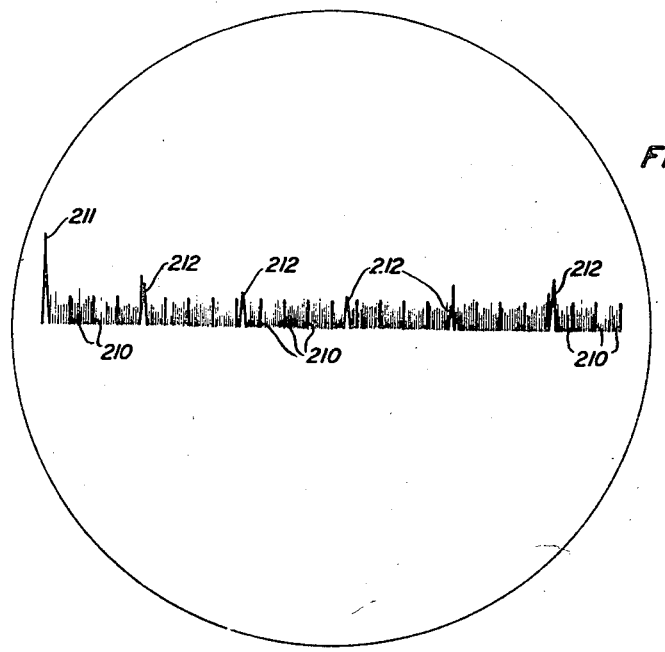
Fig. 7 shows a typical trace on the screen of the oscilloscope of the system of Fig. 1, the trace including marking pulses or "pips."

At the time the pulses shown in Fig. 4d are applied to the control grid 73 of the tube V3, this tube is conducting current. Each negative pulse 180, 182, 184, etc., of the wave shown in Fig. 4d causes this tube to be cut off, thus raising the potential of the plate 79 and applying a positive pulse to the control grid 83 of the tube V4. This positive pulse causes the tube V4 to become conducting, the tube having previously been cut off. The plate voltage of the tube V4 takes a sudden drop which, by means of the feedback connection, causes a negative pulse to be applied to the control grid of the tube V3 which accentuates the action. At the termination of each of the pulses 180, 182, 184, etc., the tube V3 becomes non-conducting again, applying a negative pulse to the tube V4 and making this tube shut off. By this means, the sharp square-top pulses 190, 192, 194, etc., shown in Fig. 4e, are produced. The positive pulses 181, 183, 185, etc., of the wave shown in Fig. 4d are clipped off by the grid-cathode conductance of V3 and thus produce no action in the monovibrator circuit. The pulses 190, 192, 194, etc., are produced until the negative pulses 180, 182, 184, etc., diminish to such an extent that the pulses produced in the output circuit of the tube V3 are no longer of sufficient amplitude to overcome the bias on the input of the tube V4. This is indicated in Fig. 4e by the fact that the wave, comprising the square-topped pulses 190, 192, 194, etc., ceases abruptly before the oscillations shown in Figs. 4b, 4c and 4d cease. The wave shown in Fig. 4e is applied to the lower one of the plates 18, 18 of the oscilloscope 15 and produces "pips," indicated by the reference character 210 in Fig. 7, on the screen 21 of the oscilloscope when a proper sweep wave is applied to the deflecting plates 18, 18. Fig. 7 also shows a transmitted pulse 211, and various echo pulses 212. It will be noted that the "pips" 210 appear on the top of the echo pulses where a "pip" and an echo pulse coincide in time. The sweep circuit shown in Fig. 3 and described above may be used to provide the sweep deflection and the sweep may be initiated concurrently with the initiation of the timing wave shown in Fig. 4g. The unblanking pulse produced in the circuit of Fig. 3 and shown in Fig. 4f is a positive pulse beginning substantially with the transmitted pulse and extending for a period of time corresponding to the duration of the sweep. This pulse unblanks the beam and allows it to reach the oscilloscope screen during the sweep period, the beam being cut off during the rest of the time between transmitted pulses. As the "pips" are regularly spaced by a time period which is equal to twice that between adjacent passages of the oscillations shown in Fig. 4b through zero value and the first one is substantially coincident with the start of the transmitted pulse, the distance on the screen between the transmitted pulse and a selected echo (and hence the range of the target producing this echo) can be readily determined by counting the number of "pips" between the transmitted pulse and the selected echo pulse.

It will be obvious that many modifications can be made in the timing circuit shown in Fig. 2. By way of example, several of these modifications will be mentioned. First, instead of the voltage pulses shown in Fig. 4e being applied to the deflecting plates of the cathode ray oscilloscope, they may be applied to the control element thereof to have the beam brighten periodically, or, if the phase of these pulses is inverted, to cause the beam to be cut off for a small period of time each microsecond. Second, the oscillations shown in Fig. 4b may be utilized in a variety of ways to produce sharp pulses approximating those shown in Fig. 4e, the invention not being limited to the specific apparatus shown for producing this result. If multivibrators are used, many varieties are known, it not being necessary to use the one shown in Fig. 2.

Figure 6:
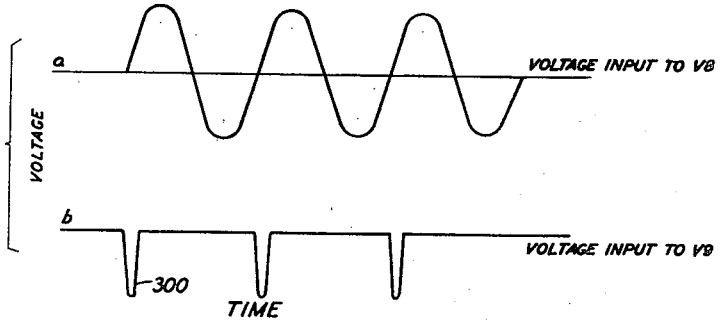
Fig. 6 is a diagrammatic representation to aid in understanding the operation of the circuit of Fig. 5.

One specific circuit for utilizing in a different manner the oscillations shown in Fig. 4b is shown in Fig. 5. In this figure the apparatus to the left of the line X—X is similar to that shown to the left of the line X—X in Fig. 2, this apparatus producing oscillations like those shown in Fig. 4b. These oscillations are applied to the tube V8 which comprises a control grid 250, a cathode 251, a screen grid 252, a suppressor grid 253 and an anode 254. The suppressor grid and the cathode are connected together and through a resistor 255 to ground. The cathode is also connected through a bleeder resistor 256 to B+. The screen grid is connected through the resistor 257 to B+ and through a parallel-connected condenser 258 and resistor 259 to ground. The anode is connected through an anode resistor 260 to B+. The control grid of the tube V8 is biased negatively with respect to its cathode by means of the resistor 255 and the bleeder resistor 256 connected to the positive voltage supply. Because of this bias, only during the positive lobes of the voltage waves applied to the control grid of the tube V8 does current flow in the plate circuit. Thus in the plate circuit of this tube are formed negative pulses each of which, for a one-megacycle oscillatory wave, is one-half a microsecond in duration and separated from its predecessor and successor by a one-half microsecond "off" period. These pulses are used to shock-excite a tuned circuit T' comprising the parallel-connected condenser 261 and inductance member 262, a coupling condenser 263 being provided between the tuned circuit and the plate 254 of the tube V8. The tuned circuit T' has its constants so chosen that it oscillates at a frequency of 5 megacycles, for example. Therefore, each of the negative pulses (similar to those shown in Fig. 4b) initiates a series of oscillations of a higher frequency. Several of the oscillations shown in Fig. 4b have been shown in Fig. 6a while the oscillations which are initiated in the tuned circuit T' are shown in Fig. 6b. (The time scale in Fig. 6 has been greatly exaggerated in comparison with that shown in Fig. 4 in order to clarify the description of the operation of the invention.) Only the first negative pulse 300, however, of each series of oscillations is utilized as the rest are damped out in a manner which will now be explained. Tube V9 to which the tuned circuit T' is connected comprises a cathode 264, an anode 265, a control grid 266, a screen grid 267 and a suppressor grid 268. The suppressor grid and the cathode are connected together and their common terminal is connected to ground. The control grid is connected to the common terminal of the inductance member 262 and the condenser 261. The screen grid is connected through the resistor 269 to B+ and through the by-pass condenser 270 to ground. The anode is connected through the inductance member 290 and the resistance 271 to B+. Inasmuch as the tube V9 is not biased, the first positive pulse causes the tube V9 to draw grid current, thus damping out the oscillations after the first negative pulse, as shown in Fig. 6b. The first negative pulse produces a positive pulse on the plate of the tube 29 which is applied by means of the coupling condenser 272 to the control grid 273 of the tube V10, which is connected as a cathode follower output tube.

The cathode 274 of the tube V10 is connected through the resistor 275 to ground. The plate 276 is connected through the resistor 277 to B+ while the suppressor grid 278 and the screen grid 279 are connected together and their common terminal connected through resistors 280 and 277 to B+. The positive pulses in the output (cathode) of the tube V10 are one-tenth of a microsecond wide but they appear only once each microsecond. The pulses are substantially half-sine waves but as their duration is so short they produce "pips" when applied as shown in Fig. 1 to the lower deflecting plate 14 of the tube 15. It is understood, of course, that they may have their phase inverted, if desired, to form negative pulses similar to those shown in Fig. 4e.

Various other modifications may be made in the invention without departing from the spirit thereof, the scope being indicated by the appended claims. Obviously, the invention is not limited to radar systems as it may also find use in television, for example, for synchronization purposes. The field scanning-frequency pulse can be used at the transmitter (as well as at the receiver) to initiate a series of accurately spaced pulses, each pulse of which can be used as a line-scanning-frequency synchronizing pulse. The circuit constants can be chosen so that the train of pulses, generated by a field synchronizing pulse or the first portion of such pulse, is terminated just before the next field pulse. Obviously, it is necessary to transmit only the frame synchonizing pulse to the receiver for synchronization pulses.

What is claimed is:

1. In combination, means for generating a series of pulses, the frequency of repetition of which varies from time to time, freely oscillatable means abruptly set into the oscillatory state by each pulse in the series for generating a series of oscillations which diminish in amplitude at such a rate that the oscillations die out before the time of occurrence of the next pulse in the series at the fixed natural frequency of said oscillatable means, and means under control of said oscillations for producing visible indications, the spacing between adjacent ones of which bearing a definite relationship to the time interval between the starting points of adjacent ones of said oscillations and each of the visible indications having a much shorter duration than a half of each of said oscillations.

2. In combination, means for generating a series of pulses, the frequency of repetition of which varies from time to time, freely oscillatable electric means abruptly set into the oscillatory state by each pulse in the series for generating a series of oscillations which diminish in amplitude at such a rate that the oscillations die out before the time of occurrence of the next pulse in the series at the fixed natural frequency of said oscillatable means, means under control of said oscillations for generating a series of sharp pulses the time interval between the leading edges of adjacent ones of which bearing a fixed relation to that between adjacent passages of said oscillations through zero value, each of said sharp pulses having a much shorter duration than a half of each of said oscillations, and means to utilize each series of said sharp pulses to indicate time intervals between said sharp pulses respectively and the pulse which initiated the corresponding series of oscillations.

3. In combination, means for generating a series of pulses, the frequency of repetition of which varies from time to time, the duration of each pulse in the series being only a small fraction of the time interval between successive pulses in the series, means responsive to each pulse in the series for generating a series of oscillations which diminish in aplitude at such a rate that the oscillations die out before the time of occurrence of the next pulse in the series at a fixed frequency which is much higher than the repetition rate of the pulses in said series, and means responsive to said oscillations for producing a series of equally-spaced sharp pulses, one pulse for each oscillation cycle, each of said sharp pulses having a much shorter duration than a half of each of said oscillations.

4. In combination, a cathode ray oscillograph having means for generating a beam of electrons, a luminescent screen, and two sets of beam deflecting elements, means for generating a series of pulses, the frequency of repetition of which varies from time to time, means responsive to each pulse in the series for generating a sweep wave, means for applying the sweep wave to one set of said beam deflecting elements, means responsive to each pulse in the series for producing a second series of pulses at a fixed repetition frequency, the pulses of each of said second series having the same spacing as in every other one of said second series even though the period between successive pulses in said first-mentioned series varies and each of the pulses in the second series having a duration which is only a very small fraction of the time interval between the pulses in said first-mentioned series, and means for applying said second-mentioned series of pulses to the other of said sets of beam deflecting elements.

5. In combination, means for generating a series of pulses, the frequency of repetition of which varies from time to time and the duration of each pulse in the series being only a small fraction of the time interval between successive pulses in the series, means responsive to each pulse in the series for generating a series of oscillations which diminish in amplitude at such a rate that the oscillations die out before the time of occurrence of the next pulse in the series at a fixed frequency of repetition which is much higher than the repetition rate of the pulses in said series, means for forming in response to said oscillations corresponding series of equally-spaced sharp pulses, each of said sharp pulses having a much shorter duration than a half of each of said oscillations, an oscillograph tube having means therein for generating a beam of electrons, and means for utilizing said series of sharp pulses to control said beam.

6. In combination, means for generating a series of pulses, the frequency of repetition of which varies from time to time and the duration of each pulse in the series being only a small fraction of the time interval between successive pulses in the series, means responsive to each pulse in the series for generating a series of oscillations which diminish in amplitude at such a rate that the oscillations die out before the time of occurrence of the next pulse in the series at a fixed frequency of repetition which is much higher than the repetition rate of the pulses in said series, means for forming in response to said oscillations corresponding series of equally-spaced sharp pulses, each of said sharp pulses having a much shorter duration than a half of each of said oscillations, an oscillograph tube having means therein for generating a beam of electrons, and means for utilizing said series of sharp pulses to deflect said beam.

7. The combination as in claim 3 in which said last-mentioned means comprises means for rectifying said oscillations, and means for differentiating said rectified wave to form a series of sharp pulses.

8. The combination of elements as in claim 3 in which said last-mentioned means comprises means for rectifying said oscillations, a tuned circuit having a natural period which is much less than that of said oscillations, and means for utilizing said rectified wave to shock-excite said tuned circuit to initiate oscillations therein.

9. In combination, means for generating a series of pulses, means responsive to each pulse in a series for generating a series of oscillations which diminish in amplitude at such a rate that the oscillations die out before the time of occurrence of the next pulse in the series at a fixed frequency of repetition which is much higher than the repetition rate of the pulses in such series, means for forming in response to said oscillations a corresponding series of sharp pulses, each of said sharp pulses having a much shorter duration than a half of each of said oscillations, and means responsive to said sharp pulses for producing a series of square-topped pulses of constant amplitude and of similar shape each of which has a much shorter duration than a half of each of said oscillations.

10. The combination as in claim 9 in which said last-mentioned means comprises two tubes having their input and output circuits interconnected and one of said tubes being so biased that when said sharp pulses are less than a predetermined magnitude no square-topped waves are produced.

11. In combination, means for generating a series of pulses, the frequency of repetition of which varies from time to time, means for producing in response to each pulse in the series a train of signal energy comprising a series of sharp, equally-spaced pulses of like duration and shape, a cathode ray oscilloscope including means for generating a beam of electrons and two sets of deflecting elements for causing said beam to be deflected in two directions at right angles to each other, means for applying said trains of signal energy to one set of deflecting elements, means responsive to each pulse in said series for setting up a timing wave, means for applying said timing wave to the same set of deflecting elements to which said trains of signal energy are applied, means for generating a sweep wave in response to each pulse in said series, and means for applying said sweep wave to the other set of deflecting elements.

12. The combination of elements as in claim 11 in further combination with means for blanking out the beam in said tube except for the period of time covered by said sweep wave.

13. The combination of elements as in claim 11 in further combination with means for delaying the start of said sweep wave until a predetermined time after the occurrence of each pulse in said series.

14. The combination of elements as in claim 1 in further combination with means responsive to each pulse in the series for producing a sweep wave, and means for utilizing said sweep wave in the production of said visible indications.

15. The combination of elements as in claim 3 in further combination with means responsive to each pulse in the series for producing a sweep wave each operating cycle of which is initiated synchronously with or at some fixed time before or after the start of the corresponding pulse in the series and is terminated at some predetermined time thereafter prior to the start of the next pulse in the series.

JOHN R. HEFELE.

REFERENCES CITED

The following references are of record in the file of this patent:

UNITED STATES PATENTS

| Number | Name | Date |
| --- | --- | --- |
| Re. 22,390 | Lewis | Nov. 9, 1943 |
| 1,908,249 | Hund | May 9, 1933 |
| 2,000,362 | Terman | May 7, 1935 |
| 2,086,918 | Luck | July 13, 1937 |
| 2,103,090 | Plebanski | Dec. 21, 1937 |
| 2,121,359 | Luck et al. | June 21, 1938 |
| 2,178,074 | Jakel et al. | Oct. 31, 1939 |
| 2,188,611 | Norton | Jan. 30, 1940 |
| 2,208,378 | Luck | July 16, 1940 |
| 2,241,256 | Gould | May 6, 1941 |
| 2,266,668 | Tubbs | Dec. 16, 1941 |
| 2,280,226 | Firestone | Apr. 21, 1942 |
| 2,320,476 | Schrader et al. | June 1, 1943 |
| 2,350,069 | Schrader et al. | May 30, 1944 |
| 2,363,810 | Schrader et al. | Nov. 28, 1944 |
| 2,364,756 | Van B. Roberts | Dec. 12, 1944 |
| 2,403,624 | Wolff | July 9, 1946 |
| 2,408,061 | Grieg | Sept. 24, 1946 |
| 2,408,078 | Labin et al. | Sept. 24, 1946 |

OTHER REFERENCES

Proceedings of the I. R. E., September 1940, "The Generation for Television of Horizontal Synchronizing Pulses from Vertical Pulses by Means of Impulse Excitation," by Jesse B. Sherman. (Copy in Div. 51.)